United States Patent [19]
Sumiyoshi et al.

[11] Patent Number: 5,721,600
[45] Date of Patent: Feb. 24, 1998

[54] REFLECTIVE LIQUID CRYSTAL DISPLAY WITH OPTICAL COMPENSATION PLATES

[75] Inventors: Ken Sumiyoshi; Masayoshi Suzuki, both of Tokyo, Japan

[73] Assignee: NEC Corporation, Tokyo, Japan

[21] Appl. No.: 725,510

[22] Filed: Oct. 4, 1996

[30]    Foreign Application Priority Data

Oct. 6, 1995   [JP]   Japan ................................. 7-286738

[51] Int. Cl.$^6$ ................................................. G02F 1/1335
[52] U.S. Cl. ........................... 349/119; 349/113; 349/121
[58] Field of Search ............................... 349/113, 119, 349/121

[56]    References Cited

U.S. PATENT DOCUMENTS

| | | | |
|---|---|---|---|
| 4,984,874 | 1/1991 | Yamamoto et al. | 349/119 |
| 5,126,866 | 6/1992 | Yoshimizu et al. | 349/119 |
| 5,179,458 | 1/1993 | Fukui | 349/119 |
| 5,220,447 | 6/1993 | Yokokura et al. | 349/119 |
| 5,406,396 | 4/1995 | Akatsuka et al. | 349/119 |
| 5,440,413 | 8/1995 | Kikuchi et al. | 349/119 |

FOREIGN PATENT DOCUMENTS

| | | |
|---|---|---|
| 5-570817 | 5/1980 | Japan . |
| 62-6225 | 1/1987 | Japan . |
| 3-223715 | 10/1991 | Japan . |
| 5-210099 | 8/1993 | Japan . |
| 6-235920 | 8/1994 | Japan . |
| 6-308479 | 11/1994 | Japan . |
| 6-308482 | 11/1994 | Japan . |
| 6-337421 | 12/1994 | Japan . |
| 7-104284 | 4/1995 | Japan . |
| WO 96/10768 | 4/1996 | WIPO . |

OTHER PUBLICATIONS

European Search Report—Application No. GB 9620742.8, Dec. 11, 1996.
J. Glueck et al.; "Fast-switching reflective HAN-mode light valves with high pixel density for colour TV projection"; Displays, vol. 16, No. 1(1995), pp. 39–42.
S.A. Lien; "Three-Dimensional Simulation of Multi-Domain Homeotropic Liquid Crystal Cells"; Jpn. J. Appl. Phys., vol. 33 (1994), pp. 6240–6244.
Proceedings of the 1995 Spring 42nd Applied Physics Association, No. 3, p. 1143 (abstract only).

*Primary Examiner*—William L. Sikes
*Assistant Examiner*—Julie Ngo
*Attorney, Agent, or Firm*—Whitham, Curtis, Whitham & McGinn

[57]    ABSTRACT

In a liquid crystal display comprising a lamination of a polarizing plate, a liquid crystal layer, a compensator and a reflector in the mentioned order, the refractive anisotropy of the liquid crystal layer and the refractive anionotropy of the compensator is opposite in sense to each other, and assuming that the liquid crystal layer is sliced in the absence of applied voltage or in the presence of a given applied voltage in the thickness direction into N sub-layers such that the liquid crystal molecule long axis bearing therein can be regarded to be substantially fixed, the liquid crystal molecule long axis orientation of the 1-st sub-layer being represented by a tilt angle $\theta_{1,i}$ and a twist angle $\phi_{1,i}$, and also assuming that the compensator consists of N sub-layers, the optic axis bearing of the 1-st sub-layer being represented by a tilt angle $\theta_{2,i}$ and a twist angle $\phi_{2,i}$, the 1-st sub-layer of the liquid crystal layer and the (N−i+1)-th sub-layer of the compensator are approximately related to each other as $\theta_{1,i}=\theta_{2,N-i+1}$, and $\phi_{1,i}=\phi_{2,N-i+1}$.

17 Claims, 10 Drawing Sheets

REFLECTIVE LIQUID CRYSTAL DISPLAY WITH OPTICAL COMPENSATION PLATES

BACKGROUND OF INVENTION

The present invention relates to a liquid crystal display and, more particularly, to a reflective liquid crystal display.

Reflecting type liquid crystal displays which consume low power and require no back light, have been developed extensively in various parts of the world. Such reflective liquid crystal displays are disclosed in, for instance, Japanese Laid-Open Patent Publication No. 6-337421 and Japanese Laid-Open Patent Publication No. 3-223715.

In these prior art systems, the double refraction of liquid crystal is controlled according to the applied voltage. The liquid crystal molecule has a long axis. As shown in FIG. 6, the orientation of the liquid crystal molecule 13 is determined by the angle (tilt angle) 11 outside a substrate plane and an angle (twist angle) 12 therein.

A typical example of the reflective liquid crystal display will now be described, which is disclosed in J. Glueck et al, "Fast-Switching Reflective HAN-Mode Light Valves with High Pixel Density for Color TV Projection", Displays, Volume 16, Number 1, pp. 39, 1995.

This technique concerns the projection type reflective liquid crystal display, but it is sufficiently applicable to direct viewing type as well. The technique uses a liquid crystal layer commonly called HAN mode. As shown in FIG. 7, in the HAN mode the liquid crystal molecule orientation is vertical on one substrate and horizontal on the other substrate. The tilt angle of the liquid crystal molecule thus varies roughly from 90 degrees to 0 degree with respect to the thickness direction of the liquid crystal layer 3.

The twist angle, on the other hand, fixed with respect to the thickness direction of the liquid crystal layer 3, and the long axis of the liquid crystal molecule has a fixed bearing in the substrate plane. As shown in FIG. 7, the liquid crystal layer 3 is held between a polarizer 1 and a reflector 4. The polarizer 1 is disposed such that its polarization transmission axis is at an angle of 45 degrees to the twist angle bearing of the liquid crystal layer 3.

Optical characteristics of the liquid crystal display having the above structure will now be described in connection with the incidence of orthogonal external light. The external light passed through the polarizer 1 is linearly polarized and incident to the liquid crystal layer 3. When the double refraction in the liquid crystal layer 3 is approximately one-fourth of the wavelength, the light right before the incidence on the reflector 4 is circularly polarized (i.e., left- or right-handedly circularly polarized). When it is reflected on the reflector 4, the circularly polarized light becomes oppositely circularly polarized light (that is, left-handed circularly polarized light becomes right-handed circularly polarized light or vice versa). When it passes again through the liquid crystal layer 3, the oppositely circularly polarized light, at the instance of emission from the liquid crystal layer 3, becomes linearly polarized and has a bearing orthogonal to the direction of linear polarization at the instance of incidence. The orthogonal linearly polarized light cannot pass through the polarizer 1, and this provides a dark display state.

When a voltage is applied across the liquid crystal layer 3, the double refraction is reduced, and the light right before the incidence on the reflector 4 is not circularly polarized, thus permitting the light passage through the polarizer 1.

In the above way, black/white display can be obtained through the control of double refraction of the liquid crystal layer according to the voltage applied thereto. The above description has concerned with the use of the HAN mode, but similar description may be made with any other mode as well, such as twisted nematic mode with a twist angle of 45 degrees, homeotropic mode, homogenous mode, etc., so long as it is possible to control the double refraction. As shown in FIG. 8, it is possible to provide a one-fourth wavelength plate 14 in addition to the HAN mode liquid crystal layer 3. In this case, when the double reflection of the liquid crystal layer 3 is made approximately zero by the voltage application, the one-fourth wavelength plate 14 converts the incident linearly polarized light to the circularly polarized light. It is thus possible to obtain a dark display state as described before. A bright display state can be obtained by reducing the applied voltage and thus varying the double refraction in the liquid crystal layer. The brightest display can be obtained when the double refraction in the liquid crystal layer 3 is of one-fourth wavelength. Here, the sum of double refraction of the liquid crystal layer 3 and quarter-wave retarder 14 is a half wavelength.

Polarization right before the incidence on the reflector 4 is linear polarization with a bearing orthogonal to the bearing of the incident linearly polarized light. The linearly polarized light is reflected as such by the reflector 4. This linearly polarized light experiences the double refraction for one-half wavelength again and passes through the polarizer 1. Thus, it will be seen that where the one-fourth wavelength plate 14 is provided along with the HAN mode liquid crystal layer 3, converse black/white display state is brought about by the voltage application. The reversal of the voltage-reflectivity relation with the one-fourth wavelength as above is possible in other modes as well.

The above prior art reflective liquid crystal display, however, has the following problems.

One of these problems will now be described with reference to FIG. 9. Where the interior light or exterior light is utilized, the oblique incidence of light is often the case. The light beam path is as shown in FIG. 9. However, the double refraction in the liquid crystal layer 3 is angle-dependent. This means that when it is designed to provide the double refraction of about one-fourth wavelength at the time of the orthogonal incidence for obtaining a dark display state, the double refraction of about one-fourth wavelength cannot be obtained in the actual use. Therefore, the polarization right before the incidence on the reflector 4 is not circular polarization, and a perfectly dark display state cannot be obtained. Similar status results from the liquid crystal double refraction control in the case shown in FIG. 8 for obtaining the bright display state. That is, when it is designed such that the emitted light as linearly polarized light with the bearing of the polarization transmission axis can be obtained with the orthogonal incidence, the obliquely emitted light is elliptically polarized. Therefore, a very bright display state cannot be obtained.

A second problem in the prior art reflective liquid crystal display is the coloring of the black/white display.

Specifically, when it is adjusted to provide double refraction of about one-fourth wavelength with a certain wavelength, the double refraction of about one-fourth wavelength cannot be obtained with other wavelengths. This means that the dark display state described before with reference to FIG. 7 is wavelength-dependent, and therefore it is impossible to obtain the perfectly black display. Similar status arises in the case of the bright display as shown in FIG. 8. That is, a colored white display state is produced in this case.

A third problem in the prior art reflective liquid crystal display is posed by the reflector 4 which generates the dispersed light. Generally, the reflector 4 does not provide the mirror surface reflection. This is so because when a reflector having a mirror surface is used, the image of the light source can be viewed in the bright display state.

For example, when an external fluorescent light is used as a light source, the reflection of its shape is viewed by the user on the liquid crystal display screen. Depending on the angle of emission, the light from the fluorescent lamp is incident on the display screen after reflection by the user's face. This situation is just like when the user views his or her own face on a mirror.

To avoid the above reflection, a diffuser with a slightly roughened surface instead of the mirror surface is necessary.

As shown in FIG. 10, where a diffuser is used as the reflector 4, reflected light that is used for the display is such that its incidence angle and reflection angle are not equal. This means that the double refraction in the case of the incidence on the reflector 4 from the polarizer 1 and the double refraction in the case of the reflection from the reflector 4 to the polarizer 1 are equal.

In other words, the above relation does not hold in the reflection light path even with adjustment of the double refraction in the incidence light path to about one-fourth wavelength, and it is impossible to obtain the restoration of linearly polarized light form oppositely directed circularly polarized light as described before in connection with FIG. 7. It is thus impossible to obtain the dark display. Similarly, the half-wavelength condition in the return light path as described before in connection with FIG. 8 cannot be met, and it is therefore impossible to obtain very bright display.

SUMMARY OF THE INVENTION

An object of the present invention, therefore, is to provide a reflective liquid crystal display, which can solve the above problems in the prior art and has very bright display and satisfactory visual angle characteristics.

According first aspect of the present invention, there is provided a liquid crystal display comprising a lamination of a polarizing plate, a liquid crystal layer, a compensator and a reflector in the mentioned order or a lamination of a polarizing plate, a compensator, a liquid crystal layer and a reflector, the lamination being made in the mentioned order, wherein the refractive anisotropy of the liquid crystal layer and the refractive anionotropy of the compensator is opposite in sense to each other; and assuming that the liquid crystal layer is sliced in the absence of applied voltage or in the presence of a given applied voltage in the thickness direction into N (N being a positive integer) sub-layers such that the liquid crystal molecule long axis bearing therein can be regarded to be substantially fixed, these sub-layers being referred to as the 1-st sub-layer, 2-nd sub-layer, . . . , N-th sub-layer from the lowermost sub-layer, the liquid crystal molecule long axis orientation of the 1-st sub-layer being represented by a tilt angle $\theta_{1,i}$ and a twist angle $\phi_{1,i}$ (i=1, . . . ,N), and also assuming that the compensator consists of N sub-layers, these sub-layers being referred to as the 1-st sub-layer, 2-nd sub-layer, . . . , N-th sub-layer, the optic axis bearing in the sub-layers being substantially constant, the optic axis bearing of the 1-st sub-layer being represented by a tilt angle $\theta_{2,i}$ and a twist angle $\phi_{2,i}$ (i=1, . . . ,N), the 1-st sub-layer of the liquid crystal layer and the (N−i+1)-th sub-layer of the compensator are approximately related to each other as:

$\theta_{1,i} = \theta_{2,N-i+1}$, and $\phi_{1,i} = \phi_{2,N-i+1}$.

According a second aspect of the present invention, there is provided a liquid crystal display comprising a lamination of a polarizing plate, an upper compensator, a liquid crystal layer, a lower compensator and a reflector, the lamination being made in the mentioned order, wherein the refractive anisotropy of the liquid crystal layer and the refractive anisotropous of the upper and lower compensators are opposite in sense to one another; and assuming that the upper compensator, the liquid crystal and the lower compensator are sliced in the thickness direction into M, (N+M) and N (N and M being positive integers) sub-layers, respectively, the optic axis bearing in the sub-layers being substantially fixed, the tilt angles and twist angles of the optic axes in the upper compensator, the liquid crystal layer in the absence of applied voltage or in the presence of a given applied voltage, and the lower compensator, represented by $\theta_{1,i}$, $\phi_{1,i}$, $\theta_{2,j}$, $\phi_{2,j}$, $\theta_{3,k}$ and $\phi_{3,k}$ (i=1, . . . ,M, j=1i, . . . ,N+M, k=1, . . . ,M), are approximately related to one another as:

$\theta_{1,i} = \theta_{2,M+N-i}$ (i=1, . . . ,M), $\phi_{1,i} = \phi_{2,M+N-i}$ (i=1, . . . ,M), $\theta_{3,i} = \theta_{2,N-1+i}$ (i=1, . . . ,M), and $\phi_{3,i} = \phi_{2,N-1+i}$ (i=1, . . . ,N).

Other objects and features will be clarified from the following description with reference to attached drawings.

PREFERRED EMBODIMENTS OF THE INVENTION

A first embodiment of the present invention will now be described with reference to FIG. 1. According to the present invention is used a lamination structure including a polarizer 1, a compensator 2, a liquid crystal layer 3 and a reflector 4. In lieu of this lamination structure, a lamination structure including a polarizer 1, a liquid crystal layer 3, a compensator 2 and a reflector 4 may be used to obtain the same effects.

First, the optic axis bearings of the liquid crystal layer 3 and the compensator 2 will be described. In the liquid crystal layer 3 the orientation of the liquid crystal molecule long axis varies with respect to the thickness direction. As described before, the orientation can be specified by the tilt angle and twist angle. When the liquid crystal layer 3 is considered to be sufficiently thinly sliced, the liquid crystal molecule long axis bearing can be thought to be substantially constant in each sub-layer.

It is now assumed that the liquid crystal layer 3 is sliced into N sub-layers, which are referred to as 1-st sub-layer, 2-nd sub-layer, ..., N-th sub-layer from the lowermost sub-layer. The liquid crystal molecule long axis orientation in the 1-st sub-layer is represented by a tilt angle of $\theta_{1,i}$ and a twist angle of $\phi_{1,i}$ (i=1,2, ..., N).

It is also assumed that the compensator 2 is sliced into the equal number of, i.e., N, sub-layers, which are referred to likewise. The optic axis bearing in the first sub-layer is represented by a tilt angle of $\theta_{2,i}$ and a twist angle of $\phi_{2,i}$ (i=1,2, ..., N). The 1-st sub-layer of the liquid crystal layer 3 and the (N−i+1) sub-layer of the compensator 2 are related to each other as:

$$\theta_{1,i} = \theta_{2,N-i+1} \quad (1\text{-a})$$

$$\phi_{1,i} = \phi_{2,N-i+1} \quad (1\text{-b})$$

Figure 1:
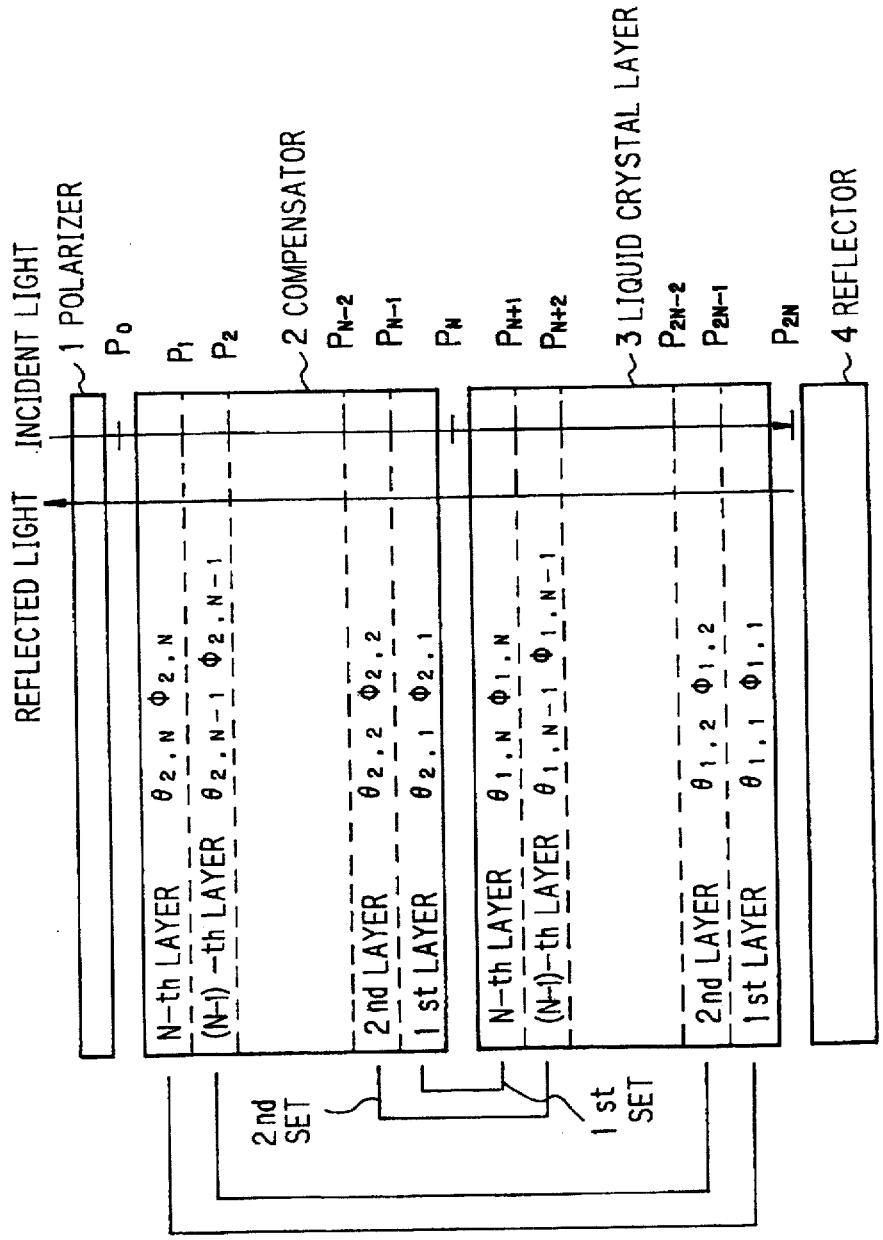
FIG. 1 is a diagrammatic view for explaining the principle and operation of the present invention.

This means that in the 1-st, 2-nd, ... 3-rd sets of the sub-layers of the liquid crystal layer 3 and the sub-layers of the compensator 2 shown in FIG. 1, the optic axis bearings in the sub-layers are parallel.

The refractive anisotropy (ΔnA) of the liquid crystal layer 3 and the refractive anisotropy (ΔnB) of the compensator 2 are opposite in sense to each other. In other words, when the refractive anisotropy of the liquid crystal layer 3 is positive, the refractive anisotropy of the compensator 2 is negative. This case will now be described, but it is to be understood that the similar description holds when the signs of the refractive anisotropy in the individual layers are opposite.

Optical characteristics of sub-layer sets shown in FIG. 1 (i.e., two layers parallel in the optic axis and opposite in the sign of the refractive anisotropy) will now be described with reference to FIG. 2.

Figure 2:
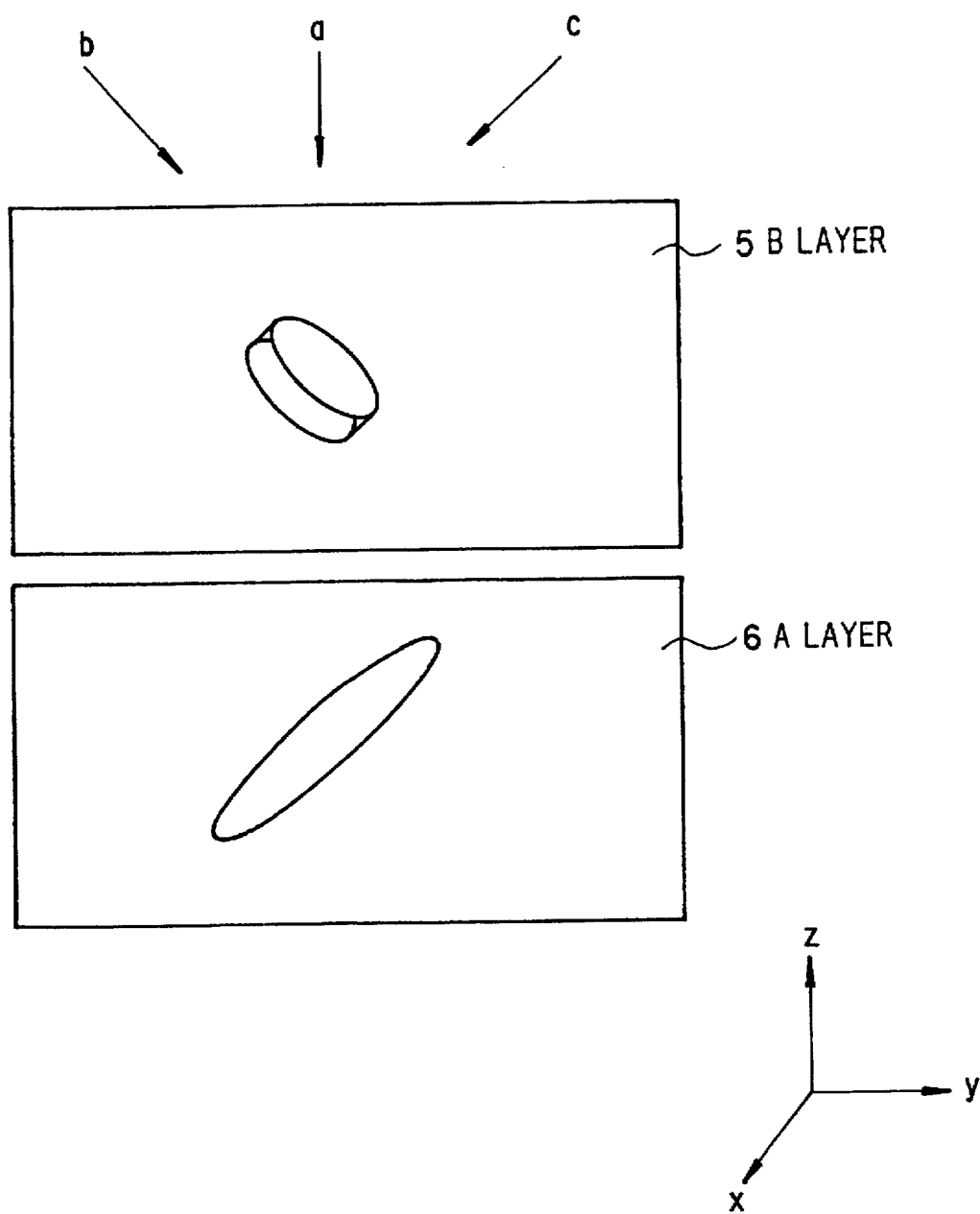
FIG. 2 is a diagrammatic sectional view for explaining the principle and operation of the present invention.

In FIG. 2, the liquid crystal 3 is shown as an A layer 6 with a positive refractive anisotropy (ΔnA), and the compensator 2 is shown as a B layer 5 with a negative refractive anisotropy (ΔnB). The A layer 6 has a thickness of dA, and the B layer 5 has a thickness of dB.

A case when the light is orthogonally incident on the above two layers from above (corresponding to incidence bearing of a in FIG. 2) will now be described.

The thickness direction of the layer is assumed to be z direction, the optic axis twist angle bearing is assumed to be x direction, and the direction perpendicular thereto is assumed to be y direction. In each layer, the refractive index is different in the x and y directions, thus producing a phase speed difference. Particularly, in the A layer 6 having the positive refractive index, the x direction is the lagging phase axis direction due to the higher refractive index, while the y direction is the leading phase axis direction.

when the incident light is in a state of given elliptical polarization, it proceeds through the A layer 6 separately in a state of x direction polarization and a state of y direction polarization. The A layer 6 thus changes the incident elliptically polarized light to a different form of elliptically polarized light. The form change of the elliptically polarized light is largely determined by the product (ΔnA·dA) of the refractive anisotropy of the A layer 6 and the thickness thereof.

In the B layer 5 having the negative refractive anisotropy, the x direction is the leading phase axis direction, and the y direction is the leading phase direction. Thus, provided the absolute value (|ΔnB·ΔdB|) of the product of the refractive anisotropy and thickness of the B layer 5, the B layer 5 restores the initial elliptically polarized light at the time of the incidence from the above elliptically polarized light. Thus, the incident elliptically polarized light is changed to a different form of elliptically polarized light through the A layer 6 and restored to the initial form through the B layer 5. While the above description is concerned with orthogonal incidence, similar description holds with oblique incidence.

With an incidence bearing of b in FIG. 2, the ΔnA value of the A layer 6 is increased. In this case, the absolute value (|ΔnB|) of the refractive anisotropy of the B layer 5 is also increased. Where optic axes of the two layers are parallel, ΔnA and |ΔnB| increase in the same manner. Thus, the process that the incident elliptically polarized light is changed to a different shape of elliptically polarized light through the A layer 6 and restored to the initial elliptically polarized light shape through the B layer 5, takes place with the incidence bearing b as well.

When the incidence bearing is tilted to a bearing of c, ΔnA of the A layer 6 is reduced, and |ΔnB| of the B layer 5 is also reduced. Since the two values are reduced in the same manner, the process that the incident elliptically polarized light is changed to a different shape of elliptically polarized light through the A layer 6 and restored to the initial elliptical polarized light through the B layer 5, also takes place. It will be seen that in the case of the oblique incidence, the incident elliptically polarized light is also changed to a different shape of elliptically polarized light through the A layer 6 and restored to the initial elliptically polarized light through the B layer 5.

The present invention will now be described with reference to FIG. 1.

First, optical characteristics when the light is incident orthogonally will be described. Polarizations of orthogonally incident light through the corresponding layers are denoted by $P_i$ (here, i=0, ... ). Incident light having been brought to a linearly polarized state ($P_0$) through the polarizer 1 undergoes changes in the polarized state to $P_1, P_2, \ldots$ through the sub-layers of the compensator 2, and has been changed to a polarized state $P_N$ through the liquid crystal layer 3. Subsequently, light emerging from the N-th sub-layer of the liquid crystal layer 3 and right before being incident on the (N−1)-th layer, is in a polarized state ($P_{N+1}$). This polarized state ($P_{N+1}$) is the same as the polarized state ($P_{N-1}$). This is so because the 1-st sub-layer in the compensator 2 and the N-th layer of the liquid crystal layer 3 are satisfying the relations shown in FIG. 2 (see the above equations (1-a) and (1-b). Likewise, the polarized states ($P_{N+2}$) and ($P_{N-2}$) are the same. This is so because the 2-nd sub-layer of the compensator and the (N−1)-th layer of the liquid crystal layer are also satisfying the relations shown in FIG. 2.

Applying the above relations to the sets of sub-layers of the liquid crystal layer 3 and polarizer 1 shown in FIG. 1, finally reaches a conclusion that the polarized states P0 and P2N are the same. Incident linearly polarized light is thus changed to elliptically polarized light through the compensator 2 and restored to the initial linearly polarized light through the liquid crystal layer 3.

The light reflected by the reflector 4 is changed to again the elliptically polarized light through the liquid crystal layer 3 and restored to the linearly polarized light through the compensator 2. Thus, it will be seen that a bright display state is obtainable. It will also be seen that this bright display state is a very bright state because the light right before the polarizer 1 is linearly polarized so that no loss is generated through the polarizer 1.

The above process of changes in linear polarization to the elliptical polarization and then to the linear polarization takes place with all the wavelengths. The above bright display state is not wavelength-dependent, so that it is possible to obtain perfectly white display.

Moreover, the whole process of changes in the state of polarization from the linear polarization to the elliptical polarization through the compensator 2, to the linear polarization through the liquid crystal layer 3, to the linear polarization through the reflector 4, to the elliptical polarization through the liquid crystal layer 3 and then to the linear polarization through the compensator 2, also takes place in the oblique incidence case. This is so because the overall process is based on the element processes of elliptical polarization to a different shape of elliptical polarization and then to the initial elliptical polarization as shown in FIG. 2 and these element processes take place in the oblique incidence case as well. It is thus possible according to the present invention that the above whole process takes place in a broader incidence angle range, so that a very bright display state can be obtained.

A combination of the optical compensation plate and liquid crystal layer having the above constitution, which is applied to a transmitting liquid crystal display, is proposed, for instance, by one of the present inventors in Japanese Laid-Open Patent Publication No. 7-104284 (Japanese Patent Application No. 5-247667). It has been found, however, that when the present invention is applied to the reflective liquid crystal display, different effects are obtainable from those in the case of the application of the present invention to a transmitting liquid crystal display.

A first one of the different effects is that while high contrast is obtainable with the transmitting liquid crystal display, with the reflective one it is possible to obtain a bright, colorless white display state.

A second effect is the above first effect is obtainable by using a reflector of scattering type as well.

Figure 3:
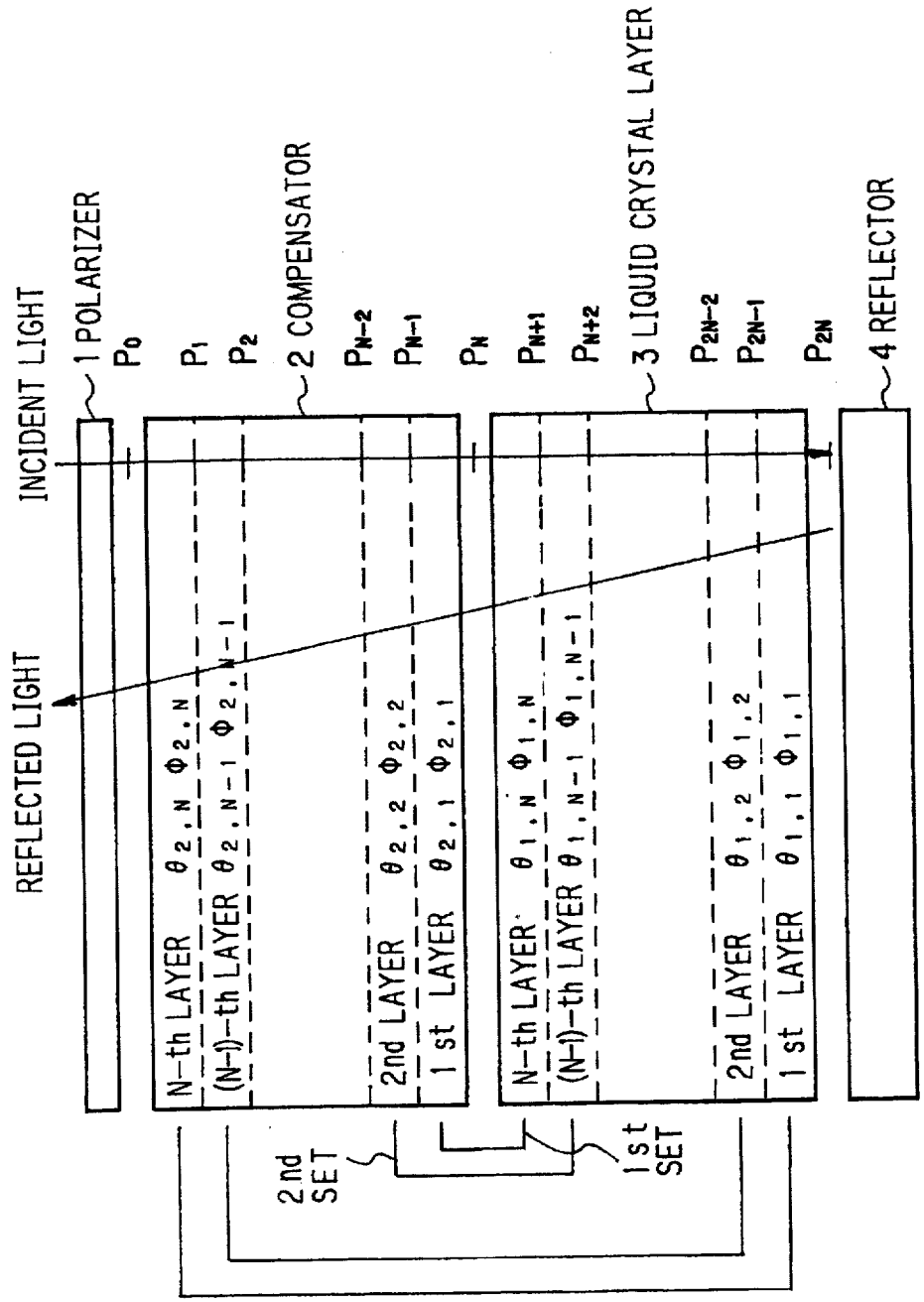
FIGS. 3 and 4 are diagrammatic views for explaining the principle and operation of the present invention.

A reflective liquid crystal display using a reflector of scattering type, in which the incidence angle and the reflection angle are different, will now be described with reference to FIG. 3. Again in this case, in the forward light path (i.e., incident light path) linearly polarized light is changed to the elliptically polarized light through the liquid crystal layer and then to the linearly polarized light through the liquid crystal layer. Also, in the return light path (i.e., reflective light path) the linearly polarized light is changed to the elliptically polarized light through the compensator.

However, since the linearly polarized light is always restored right before the incidence on the reflector 4, the double refraction received in the forward light path and that received in the return light path need not be the same. Consequently, even where the reflector of scattering type in which the incidence angle and reflection angle are different are used, the final reflected light is not elliptically polarized, and a very bright display state can also be obtained.

Figure 4:
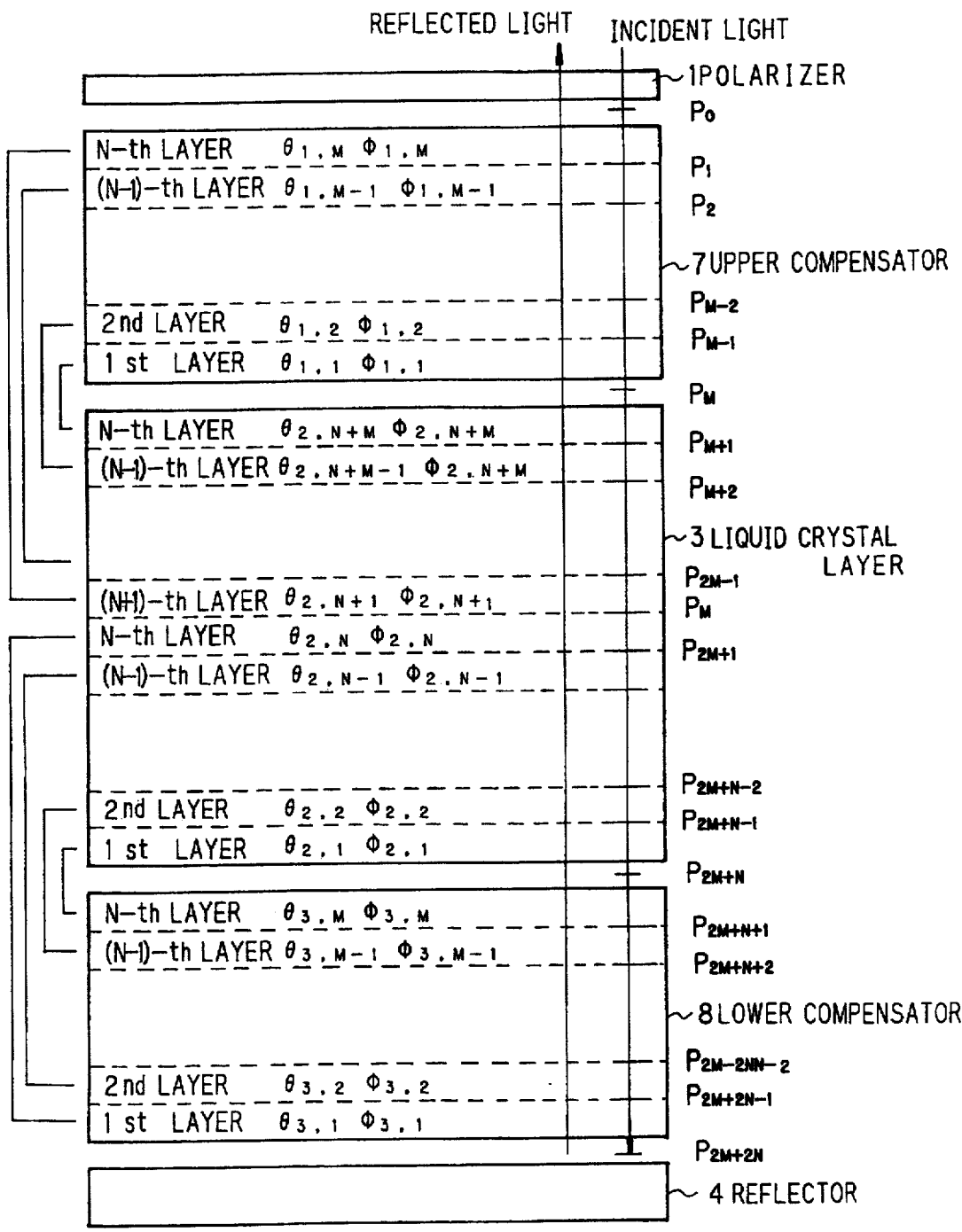

A second embodiment of the present invention will now be described with reference to FIG. 4. According to the present invention is used a lamination structure including a polarizing plate, an upper compensator, a liquid crystal layer, a lower compensator and a reflector. As shown in FIG. 4, it is assumed that the upper compensator 7 is sliced into M sub-layers, the liquid crystal layer 3 is sliced into (N+M) (M and N being positive integers) sub-layers, and the lower compensator 8 is sliced into N sub-layers and that the individual sub-layers have a fixed optic axis bearing.

The tilt angles and twist angles of the optic axes of the sub-layers of the upper compensator 7, the liquid crystal layer 3 and the lower compensator 8 are referred to as $\theta_{1,i}$, $\phi_{1,i}$, $\theta_{2,j}$, $\phi_{2,j}$, $\theta_{3,k}$ and $\phi_{3,k}$ (i=1,...,M, j=1,...,N+M, k=1,...,N), respectively. According to the present invention, the following relations are satisfied.

$$\theta_{1,i} = \theta_{2,M+N-i} \; (i = 1, \ldots, M) \tag{2-a}$$

$$\phi_{1,i} = \phi_{2,M+N-i} \; (i = 1, \ldots, M) \tag{2-b}$$

$$\theta_{3,i} = \theta_{2,N-1+i} \; (i = 1, \ldots, N) \tag{2-c}$$

$$\phi_{3,i} = \phi_{2,N-1+i} \; (i = 1, \ldots, N) \tag{2-d}$$

The optic axes in the sub-layers in each sub-layer set shown in FIG. 4 are parallel.

The refractive anisotropous $\Delta n1$ and $\Delta n3$ of the upper and lower compensators 7 and 8 and are opposite in sense to the refractive anisotropy $\Delta n2$ of the liquid crystal layer 3.

Optical characteristics of the above structure in the orthogonal light incidence case will now be described with reference to FIG. 4. Individual states of light polarization are referred to as $P_O, \ldots, P_{N+M}$. Light is linearly polarized to the state $P_O$ through the polarizer 1 and then polarized to the state $P_M$ through the upper compensator 7. The polarized state $(P_{M+1})$ of light right after the passage through the (M+N)-th sub-layer of the liquid crystal layer 3 is the same as the state $(P_{M-1})$. This is so owing to the element processes described before in connection with FIG. 2.

Through like considerations, it is seen that the polarized states $(P_{N+1})$ and $P_O$ are the same, and that the polarized states $P_O$ and $(P_{2M+2N+2})$ are the same. The whole process is as follows.

Incident linearly polarized light is changed to the elliptically polarized light through the upper compensator 7 and then restored to the initial linearly polarized light through an upper portion of the liquid crystal layer 3. Then, this light is changed to the elliptically polarized light through a lower portion of the liquid crystal layer 3 and restored to the initial linearly polarized light through the lower compensator 8.

The linearly polarized light is reflected as such by the reflector 4 and then undergoes a similar process to be finally reflected in the same state as the linearly polarized light at the time of the incidence.

The above process is based on the element processes shown in FIG. 2. With this structure according to the present invention it is thus possible to obtain the same effects of the first embodiment as described above.

According to a third embodiment of the present invention, the upper or lower compensator may be omitted to obtain the same effects. This is so because the finally reflected light is closer to the initial linearly polarized light than in the case where the sole liquid crystal layer 3 is provided.

According to a fourth embodiment of the present invention, it is possible to ignore the twist angle bearing of each sub-layer of the compensator for obtaining sufficient effects. Particularly, where the tilt angle in the liquid crystal layer is large, the twist angle bearing therein is meaningless.

A typical example is one in which the tilt angle in the liquid crystal layer is 90 degrees. In this case, the twist angle bearing in the liquid crystal layer is meaningless. However, even with a tilt angle in liquid crystal of, for instance, about 80 degrees, the projection of the liquid crystal molecule long axis on the substrate surface s very small. It is thus possible to ignore the twist angle bearing in the liquid crystal. Sufficient effects are obtainable even by ignoring the twist angle bearing of the compensator.

According to a seventh embodiment of the present invention, the tilt angles $\theta_{2,1}, \theta_{2,2}, \ldots, \theta_{2,N}$ in the sub-layers of the compensator according to the fourth embodiment, can be represented by $\theta_{2,1}, \theta_{2,2}, \ldots, \theta_{2,P}$ (O<P<N), respectively.

As a method of representing the tilt angles in the sub-layers of the compensator with predetermined representative values, it is possible to take arithmetic means. It is also possible to design the compensator such that the same double refraction as that of the compensator according to the fourth embodiment. It is thus possible to approximate the compensator consisting of N sub-layers with a P-sub-layer compensator having a simpler structure. Even in this case, it is possible to obtain sufficient effects.

According to an eighth embodiment of the present invention is provided a liquid crystal display, which is featured in that the tilt angles $\theta_{1,1}, \theta_{1,2}, \ldots, \theta_{1,M}$ of the upper compensator and the tilt angles $\theta_{3,1}, \theta_{3,2}, \ldots, \theta_{3,N}$ in the lower compensator according to the fifth embodiment, are represented by $\theta_{1,1}, \theta_{1,2}, \ldots, \theta_{1,P}$ (O<P<M) and $\theta_{3,1}, \theta_{2,2}, \ldots, \theta_{3,Q}$ (O<Q<N), respectively. As a typical method of representation, it is possible to take arithmetic means. It is also possible to design the compensators such that the same double refraction as that of the compensator according to the fifth embodiment. It is thus possible to approximate the N-sub-layer and M-sub-layer compensators with a P- or Q-sub-layer compensators having the simpler structure. Again in this case, it is possible to obtain sufficient effects.

In many prior art transmitting liquid crystal displays, a plurality of regions different in the molecule orientation are provided to improve the visual angle dependency. Doing so has an aim of averaging the visual angle dependency by providing a plurality of different molecule orientation directions.

Two methods are conceivable to this end. In one of these methods, a region which is thought to have a single molecule orientation in the absence of applied voltage is divided into a plurality of sub-regions different in molecule orientation by applying the voltage. An example of this technique is disclosed in "Three-Dimensional Simulation of Multi-Domain homeotropic Liquid Crystal Cells", Elin JJAP, Vo. 33, pp. 6240–6244, 1994.

The other method is a converse one, that is, a plurality of sub-layers which are different in molecule orientation in the absence of applied voltage are made to be a region which can be thought to be a single molecule orientation region by application of a voltage. An example of this technique is disclosed, in for instance, Japanese Laid-Open Patent Publication No. 5-210099.

In the above case, the optic axis arrangement of the compensator may be designed such as to permit provision of a single molecule orientation region according to the first to sixth embodiments. With the above structure, a bright display state is obtained when the single molecule orientation region is provided, and it is thus possible to obtain the effects according to the sixth embodiment.

When a plurality of sub-layers different in molecule orientation are provided, a dark display state prevails. In this case, an effect of averaging of the visual angle dependencies are obtainable. As is seen from the above, it is possible to obtain a very bright display state and a dark display state with gentle visual angle dependency.

It is further possible to provide optic axis arrangement in the compensator such as to provide for a plurality of sub-regions different in molecule orientation.

In this case, it is necessary to divide the compensator into a plurality of sub-layers in correspondence to the liquid crystal layer regions. Doing so permits better visual recognition of the bright state owing to the effect in either of the first to sixth embodiments and the visual angle dependency averaging effect. The foregoing is the functions obtainable according to the ninth embodiment.

In the description so far, no particular liquid crystal display mode is mentioned. This is so because the first to ninth embodiments are applicable to any liquid crystal display mode.

Particularly, the present invention is applicable to modes extensively used with reflective liquid crystal, such as (1) a homeotropic mode as disclosed in Japanese Laid-Open Patent Publication No. 6-337421, (2) a 45-degree twisted nematic mode as disclosed in Japanese Laid-Open Patent Publication No. 55-70817, (3) a homogenous mode as disclosed in Japanese Laid-Open Patent Publication No. 6-308482, (4) a bend orientation mode as disclosed in Japanese Laid-Open Patent Publication No. 6-337421, (5) a super-twisted nematic mode as disclosed in Japanese Laid-Open Patent Publication No. 6-308479, (6) a HAN mode as disclosed in the Proceedings of the 1995 Spring 42-th Applied Physics Association, No. 3, pp. 1,143, (7) a display mode using ferro-dielectric liquid crystal mode as disclosed in Japanese Laid-Open Patent Publication No. 62-6225, and (8) a bi-stable mode with homogenous orientation and 360-degree twisted orientation as pseudo stable status as disclosed in Japanese Laid-Open Patent Publication No. 6-235920.

As a further effect, by introducing a two-color pigment for suppressing the dark display state reflectivity, a darker display state can be obtained in addition to the effects of the first to eighth embodiments.

As described before in connection with the prior art, it is possible to reverse the black/white relation according to the first to ninth embodiments by adding a one-fourth wavelength plate.

Figure 5:
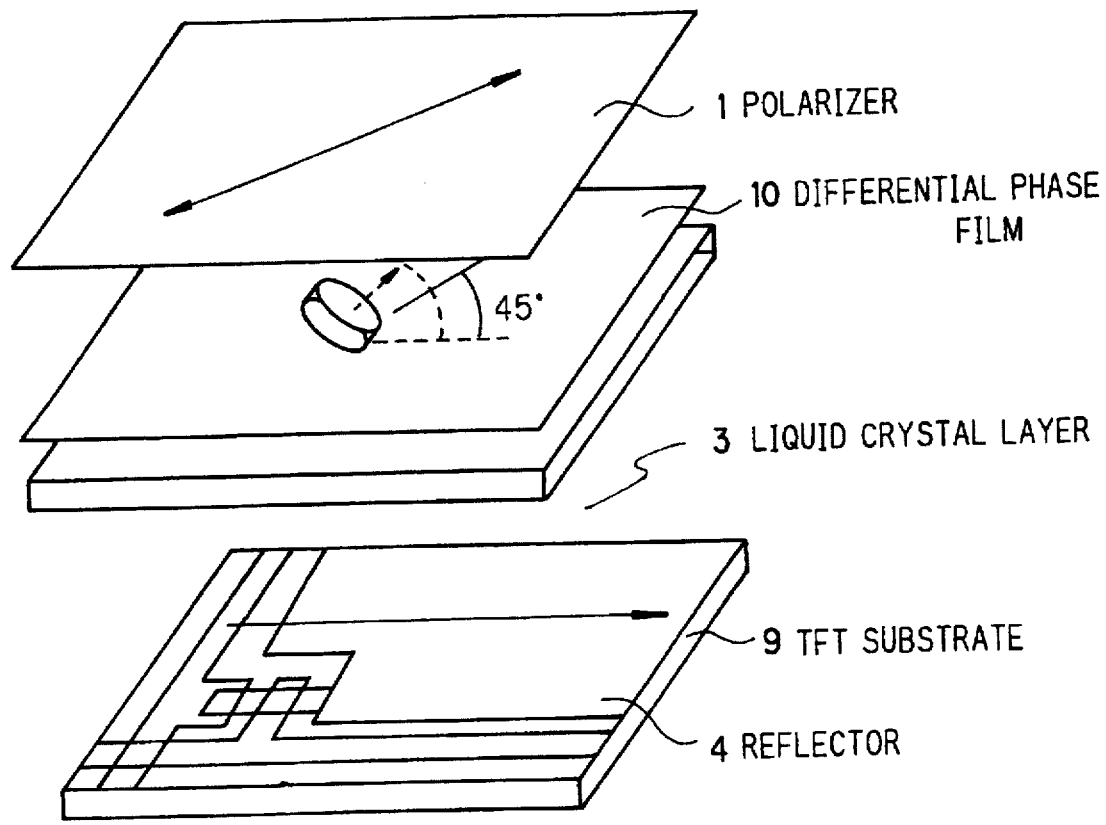
FIG. 5 is a diagrammatic exploded perspective view for explaining an embodiment of the present invention.
Figure 6:
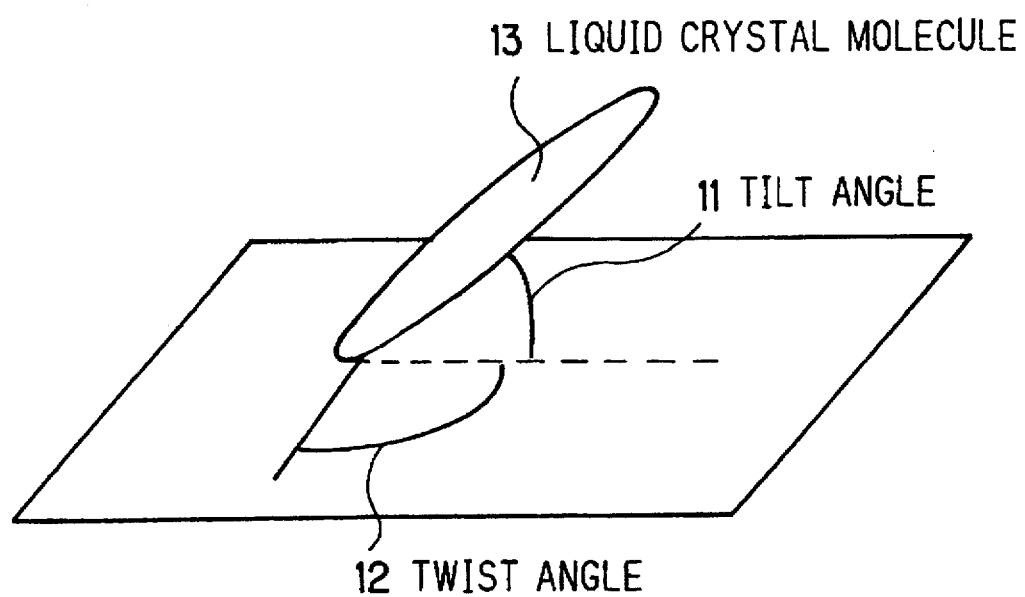
FIG. 6 is a drawing for explaining the tilt angle and twist angle of the liquid crystal molecule.
Figure 7:
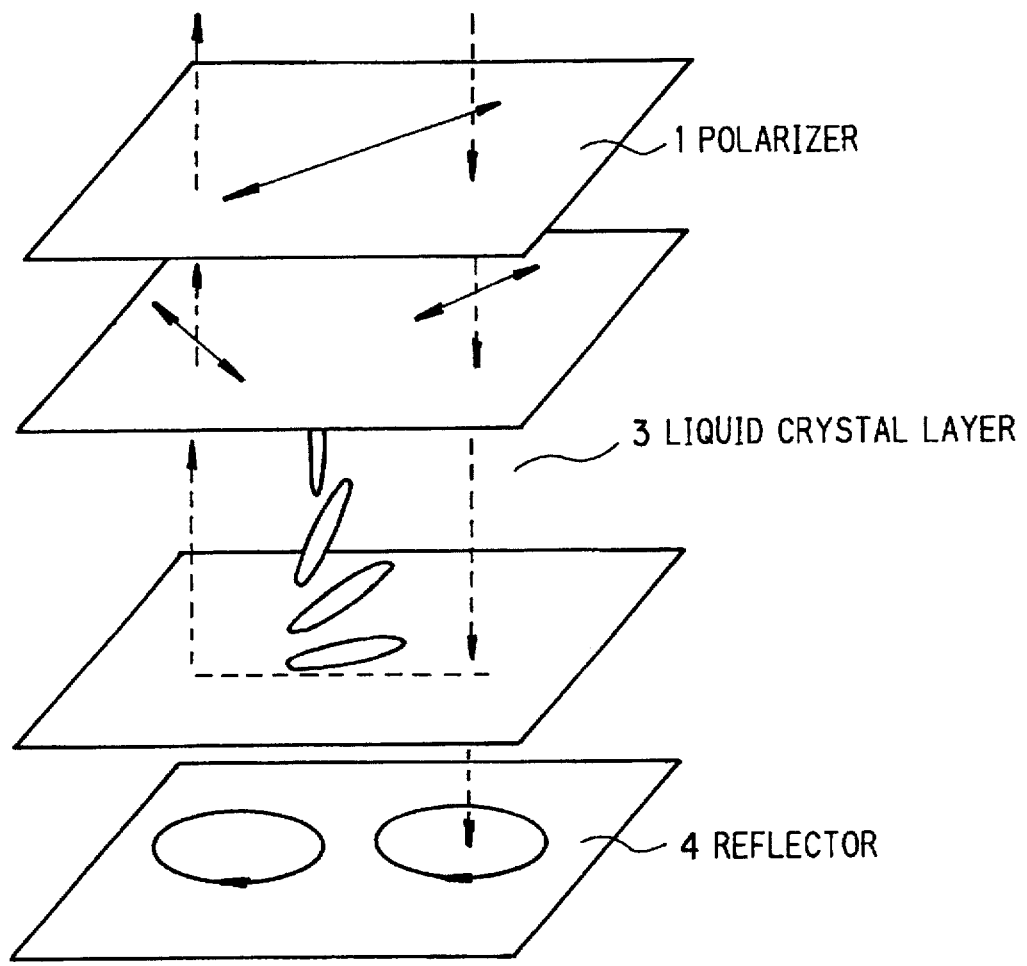
FIG. 7 is a drawing for explaining the conventional HAN mode.
Figure 8:
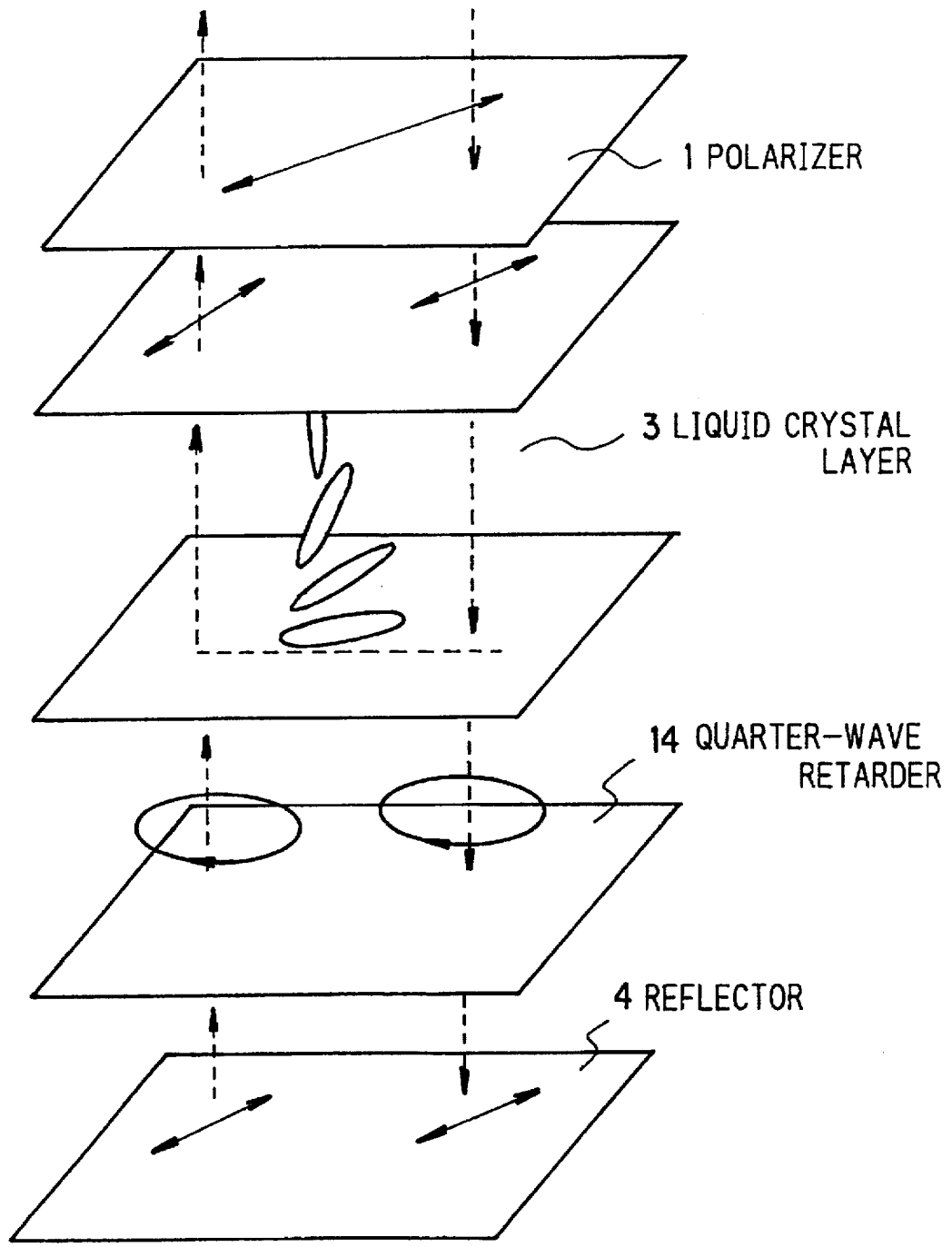
FIG. 8 is a drawing for explaining the combination of the HAN mode and quarter-wave retarder.
Figure 9:
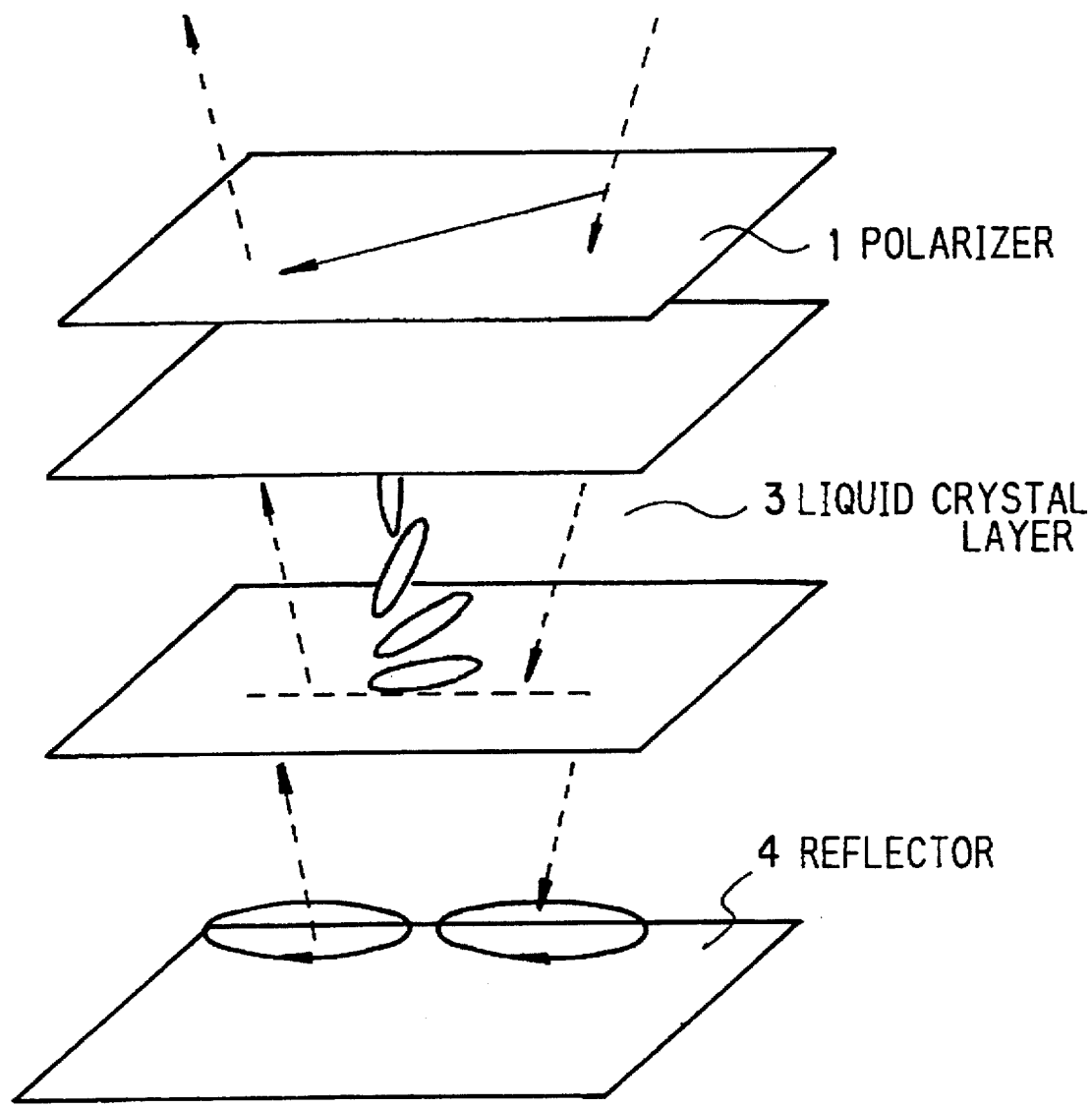
FIG. 9 is a drawing for explaining the angle dependency of the HAN mode.
Figure 10:
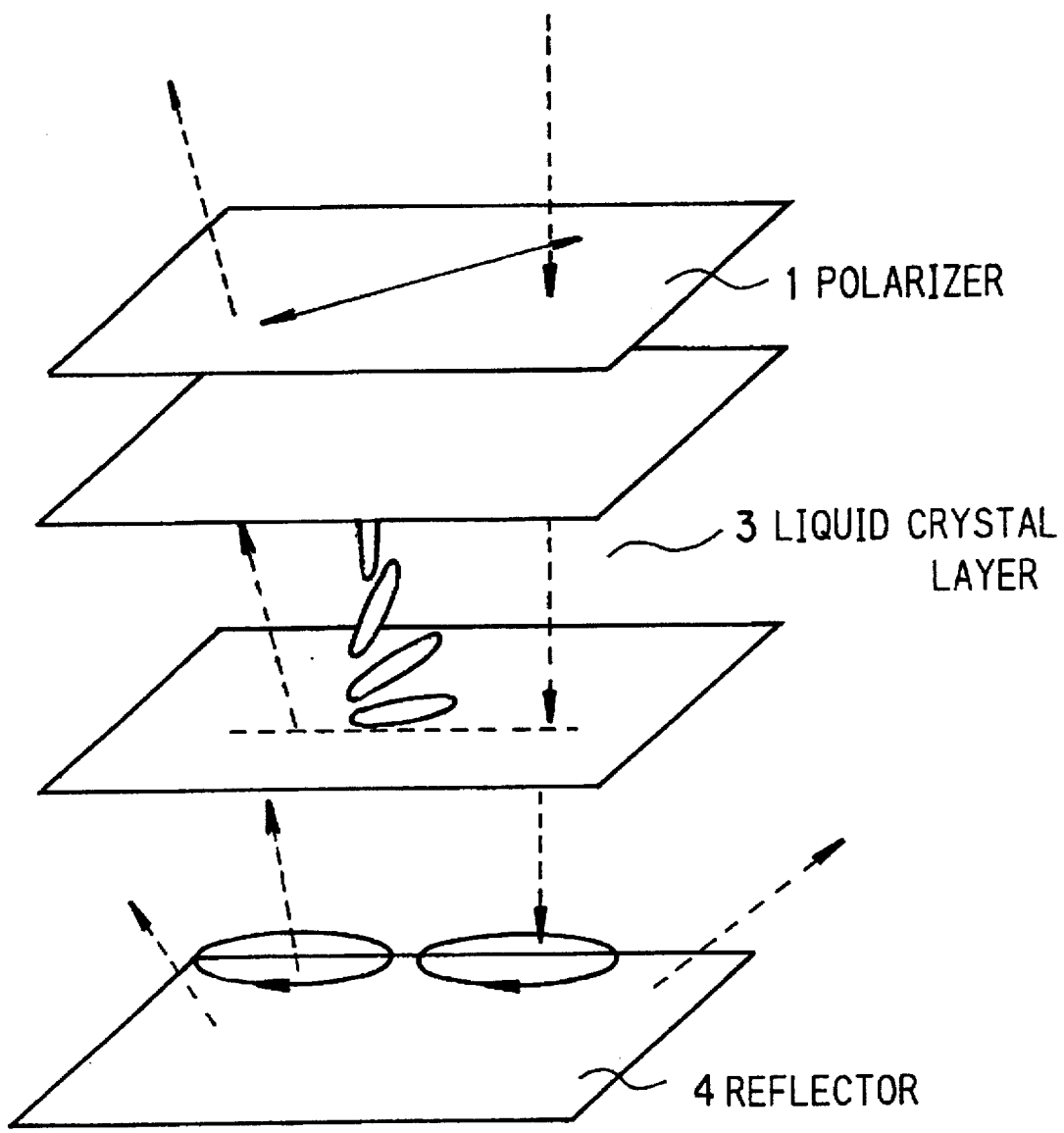
FIG. 10 is a drawing which uses the diffuser in the conventional HAN mode.

An example of the present invention will now be described with reference to FIG. 5. As one of opposed substrates was used one, which was prepared by forming an amorphous silicon thin film transistor array on a glass substrate (hereinafter referred to as TFT substrate 9. The amorphous silicon thin film transistor array had a pixel size of 200 μm ×50 μm. An element electrode for the display was formed by using a chromium thin film. The element electrode also served as the reflector 4. As the other or opposed substrate was used one which has a common electrode consisting of an ITO (indium tin oxide) thin film and a light-blocking film constituted by a chromium thin film. On the TFT substrate 9 a polyimide thin film (available under a trademark "AL1051", manufactured by Japan Synthetic Rubber Co., LTD.) was formed by a print coating and sintering process, and it was subjected to a rubbing process. The direction of the rubbing process is as shown by arrow on the TFT substrate as shown in FIG. 5.

On the opposed substrate an orientation film (available under a trademark "SE7511L", manufactured by Nissan Chemical Industries LTD.) was formed by a print coating and sintering process.

The two substrates thus prepared are applied together with an intervening 5 μm spacer provided between them. In an evacuated vessel, nematic liquid crystal (available under a trademark "ZLI-4792", manufactured by E. Merck) was poured into the space between the two substrates and was then sealed.

A compensation plate was then applied to the surface of the opposed substrate. The compensation plate was prepared in the following manner.

A differential phase film 10, in which the refractivity in its thickness direction is less than that in its surface (available under a trademark "VAC-60", manufactured by Sumitomo Chemical Co., Ltd., about 100 μm thick) was clamped between iron plates heated to 180° C., and a stress is generated in it in the surface direction. The optic axis of the film was found, by a measurement using an Ellipsometer, that it was tilted by about 20 degrees with respect to the normal to the film plane. This compensator 10 was applied to the liquid crystal panel surface. An IC for supplying a display signal is connected to the liquid crystal display, and a display operation thereof is caused. By causing white illumination light to be incident on the display with at a bearing angle of 45 degrees, a maximum reflectivity of 45% could be obtained in the bright display state. Afterwards, by removing the compensator 10, the maximum reflectivity in the bright display state was measured, and it was found to be 39%.

It was thus found that a brighter reflector than those in the prior art could be obtained by using the liquid crystal display embodying the present invention.

According to the present invention, bright reflective liquid crystal is obtainable. Also, improved visual angle characteristics compared to the prior art are obtainable.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A liquid crystal display comprising a lamination of a polarizing plate, a liquid crystal layer, a compensator and a reflector in the mentioned order or a lamination of a polarizing plate, a compensator, a liquid crystal layer and a reflector, the lamination being made in the mentioned order, wherein:

the refractive anisotropy of the liquid crystal layer and the refractive anionotropy of the compensator is opposite in sense to each other; and assuming that the liquid crystal layer is sliced in the absence of applied voltage or in the presence of a given applied voltage in the thickness direction into N (N being a positive integer) sub-layers such that the liquid crystal molecule long axis bearing therein can be regarded to be substantially fixed, these sub-layers being referred to as the 1-st sub-layer, 2-nd sub-layer, ..., N-th sub-layer from the lowermost sub-layer, the liquid crystal molecule long axis orientation of the 1-st sub-layer being represented by a tilt angle $\theta_{1,i}$ and a twist angle $\phi_{1,i}$ ($i=1,\ldots,N$), and also assuming that the compensator consists of N sub-layers, these sub-layers being referred to as the 1-st sub-layer, 2-nd sub-layer, ..., N-th sub-layer, the optic axis bearing in the sub-layers being substantially constant, the optic axis bearing of the 1-st sub-layer being represented by a tilt angle $\theta_{2,i}$ and a twist angle $\phi_{2,i}$ ($i=1,\ldots,N$), the 1-st sub-layer of the liquid crystal layer and the (N−i+1)-th sub-layer of the compensator are approximately related to each other as:

$\theta_{1,i}=\theta_{2,N-i+1}$, and $\phi_{1,i}=\phi_{2,N-i+1}$.

2. The liquid crystal display according to claim 1, wherein the designation of the twist angle in the compensator consisting of N sub-layers is replaced with $\phi_{2,N-i+1}=0$.

3. The liquid crystal display according to claim 2, wherein the tilt angles $\theta_{2,1}, \theta_{2,2}, \ldots, \theta_{2,N}$ in the sub-layers of the compensator are represented by $\theta_{2,1}, \theta_{2,2}, \ldots, \theta_{2,P}$ (0<P<N), respectively.

4. The liquid, crystal display according to claim 1 wherein the liquid crystal layer is divided into a plurality of regions different in molecule orientation in the presence of an applied voltage or absence of applied voltage.

5. The liquid crystal display according to claim 1 wherein the liquid crystal layer is of a homeotropic mode.

6. The liquid crystal display according to claim 1 wherein the liquid crystal layer is of a twisted nematic mode with a twist angle of approximately 45 degrees.

7. The liquid crystal display according to claim 1 wherein the liquid crystal layer is of a HAN mode.

8. The liquid crystal display according to claim 1 wherein the liquid crystal layer is of a torsionally twisted nematic mode.

9. The liquid crystal display according to claim 1 wherein the liquid crystal mode is the liquid crystal layer is of a bi-stable mode having a pseudo bi-stable state with homogenous orientation and 360-degree twist and a 180-degree twist state in the absence of applied voltage.

10. The liquid crystal display according to claim 1 wherein the liquid crystal layer uses a ferro-dielectric liquid crystal.

11. The liquid crystal display according to claim 1 wherein a two- or uni-color pigment is introduced in the liquid crystal layer.

12. The liquid crystal layer according to claim 1 which further comprises a one-fourth wavelength plate.

13. A liquid crystal display comprising a lamination of a polarizing plate, an upper compensator, a liquid crystal layer, a lower compensator and a reflector, the lamination being made in the mentioned order, wherein:

the refractive anisotropy of the liquid crystal layer and the refractive anisotropous of the upper and lower compensators are opposite in sense to one another; and assuming that the upper compensator, the liquid crystal and the lower compensator are sliced in the thickness direction into M, (N+M) and N (N and M being positive integers) sub-layers, respectively, the optic axis bearing in the sub-layers being substantially fixed, the tilt angles and twist angles of the optic axes in the upper compensator, the liquid crystal layer in the absence of applied voltage or in the presence of a given applied voltage, and the lower compensator, represented by $\theta_{1,i}, \phi_{1,i}, \theta_{2,j}, \phi_{2,j}, \theta_{3,k}$ and $\phi_{3,k}$ ($i=1,\ldots,M, j=1,\ldots,N+M, k=1,\ldots,M$), are approximately related to one another as:

$\theta_{1,i}=\theta_{2,M+N-i}$ ($i=1,\ldots,M$), $\phi_{1,i}=\phi_{2,M+N-i}$ ($i=1,\ldots,M$), $\theta_{3,i}=\theta_{2,N-1+i}$ ($i=1,\ldots,M$), and $\phi_{3,i}=\phi_{2,N-1+i}$ ($i=1,\ldots,N$).

14. The liquid crystal display according to claim 13, wherein either of the upper and lower compensators is omitted.

15. The liquid crystal display according to claim 13, wherein the designation of the twist angles in upper compensator consisting of M sub-layers and the lower compensator consisting of N layers is replaced with $\phi_{1,i}=0$ ($i=1,\ldots,M$), and $\phi_{3,j}=0$ ($j=1,\ldots,N$).

16. The liquid crystal display according to claim 15, wherein either of the upper and lower compensators is omitted.

17. The liquid crystal display according to claim 15, wherein the tilt angles $\theta_{1,1}, \theta_{1,2}, \ldots, \theta_{1,M}$ in the sub-layers of the upper compensator are represented by $\theta_{1,1}, \theta_{1,2}, \ldots, \theta_{1,P}$ (O<Q<M), respectively, and the tilt angles $\theta_{3,1}, \theta_{3,2}, \ldots, \theta_{3,N}$ of the lower compensator are represented by $\theta_{3,1}, \theta_{3,2}, \ldots, \theta_{3,Q}$ (O<Q<N), respectively.

* * * * *